(12) United States Patent
Chiu (10) Patent No.: US 9,929,671 B2
(45) Date of Patent: Mar. 27, 2018

(54) POWER CONVERTER IN POWERED DEVICE OF POWER-OVER-ETHERNET SYSTEM AND CONTROL METHOD THEREOF

(71) Applicant: SEMICONDUCTOR COMPONENTS INDUSTRIES, LLC, Phoenix, AZ (US)

(72) Inventor: Chen-Hua Chiu, New Taipei (TW)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/286,590

(22) Filed: Oct. 6, 2016

(65) Prior Publication Data

US 2017/0104421 A1    Apr. 13, 2017

Related U.S. Application Data

(60) Provisional application No. 62/238,147, filed on Oct. 7, 2015.

(51) Int. Cl.
| | |
|---|---|
| H02M 7/66 | (2006.01) |
| H02M 7/06 | (2006.01) |
| H02M 1/08 | (2006.01) |
| H04L 12/10 | (2006.01) |

(52) U.S. Cl.
CPC ............. *H02M 7/066* (2013.01); *H02M 1/08* (2013.01); *H04L 12/10* (2013.01)

(58) Field of Classification Search
CPC .... H02M 7/066; H02M 7/068; H02M 7/1555; H02M 7/623; H02M 7/217; H02M 3/33507; H02M 3/33523; H02M 3/33592; Y02B 70/1475
USPC .................................................. 363/125–132
See application file for complete search history.

(56) References Cited

U.S. PATENT DOCUMENTS

| | | | | |
|---|---|---|---|---|
| 8,279,883 | B2* | 10/2012 | Diab | H04L 12/40032 370/389 |
| 9,639,135 | B2* | 5/2017 | Brooks | G06F 1/3206 |
| 2006/0239183 | A1* | 10/2006 | Robitaille | G06F 1/266 370/217 |
| 2008/0062586 | A1* | 3/2008 | Apfel | H04L 12/10 361/18 |
| 2014/0313794 | A1* | 10/2014 | Ono | H02M 3/33523 363/21.15 |

(Continued)

*Primary Examiner* — Yemane Mehari
(74) *Attorney, Agent, or Firm* — Robert F. Hightower (57) ABSTRACT

A power converter in a powered device (PD) of Power-over-Ethernet (PoE) system and a control method are provided. The power converter includes a transformer, a PD interface, a primary-side controller and a detecting circuit. The PD interface receives an input voltage to determine a PoE protocol type of the input voltage, so as to generate a first power type signal. The primary-side controller receives the first power type signal to adjust a primary-side control signal, wherein a primary-side switch is controlled by the primary-side control signal. The detecting circuit detects a mapping signal generated in a secondary-side winding according to the primary-side control signal to generate a second power type signal, wherein the second power type signal indicates the PoE protocol type of the input voltage.

20 Claims, 11 Drawing Sheets

(56) References Cited

U.S. PATENT DOCUMENTS

2015/0145324 A1\* 5/2015 Heath ..................... H04B 3/56
307/1

\* cited by examiner

POWER CONVERTER IN POWERED DEVICE OF POWER-OVER-ETHERNET SYSTEM AND CONTROL METHOD THEREOF

CROSS-REFERENCE TO RELATED APPLICATION

This application claims the priority benefits of U.S. provisional application Ser. No. 62/238,147, filed on Oct. 7, 2015. The entirety of the above-mentioned patent application is hereby incorporated by reference herein and made a part of this specification.

BACKGROUND OF THE INVENTION

1. Field of the Invention

The present invention relates to power converting technology, in particular, to a power converter in Power-over-Ethernet (PoE) system and control method thereof.

2. Description of Related Art

The PoE technology can transport power and data to the corresponding electronic device through the twisted pair cable in Ethernet. The PoE technology mainly is divided into power sourcing equipment (PSE) and powered device (PD). Currently in the art, the PoE technology mainly takes two communication protocols. One PoE communication protocol is IEEE 802.3 AF. This PoE communication protocol at the PSE provides a direct-current (DC) power with a voltage of 44V to 57V and a current of about 350 mA and the PD can obtain the power of at least 12.95 W through the cable of CAT-3. Another PoE communication protocol is IEEE 802.3 AT. This PoE communication protocol can be compatible with the foregoing 802.3 AT but also provides a direct-current (DC) power with a voltage of 50V to 57V and a current of about 600 mA, and the PD can obtain the power of at least 25.5 W through the cable of CAT-5. Therefore, the PSE using IEEE 802.3 AF is called type-1 power system and the PSE using IEEE 802.3 AT is called type-2 power system. The PD can recognize the power system type used by the PSE from the input voltage.

When implementing the PoE technology, to allow the control circuit at the secondary side of transformer in the PSE to obtain that the input voltage received at the primary side of transformer is belonging to type-1 power system or type-2 power system, the optical coupler is usually taken to transmit a signal, which is used to determine as the type-1 power system or the type-2 power system, from the primary side of the transformer to the control circuit at the secondary-side. However, the optical coupler is easily broken due to the internal LED source, and manufacturers intend to take another way to implement the power converter in the PoE technology.

SUMMARY OF THE INVENTION

The invention provides a power converter of a powered device in PoE system and a control method thereof. The control circuit at the secondary side of transformer can obtain the PoE communication protocol taken by the PSE without need of using the optical coupler.

In an embodiment of the invention, a power converter of a PD in PoE system includes a transformer, a PD interface, a primary-side switch, a primary-side controller and a detecting circuit. The transformer includes a primary-side winding and a secondary-side winding. The PD interface is located at a primary side of the transformer. The PD interface receives an input voltage to determine a PoE protocol type of the input voltage, so as to generate a first power type signal. The primary-side switch is coupled to the primary-side winding. The primary-side controller receives the first power type signal to adjust a primary-side control signal, wherein the primary-side switch is controlled by the primary-side control signal. The detecting circuit is coupled to the secondary-side winding. The detecting circuit detects a mapping signal generated the secondary-side winding according to the primary-side control signal to generate a second power type signal. The second power type signal indicates the PoE protocol type of the input voltage.

In an embodiment of the invention, a control method of a power converter is disclosed in the invention, in which the power converter is located in a PD of PoE system. The control method includes the following steps: determining a PoE protocol type of an input voltage, so as to generate a first power type signal. The first power type signal is referred to adjust a primary-side control signal, in which the primary-side control signal is used to control a primary-side switch of a transformer in the power converter. And, a detecting circuit located at a secondary side of the transformer is used to detect a mapping signal generated in the secondary-side winding according to the primary-side control signal to generate a second power type signal. The second power type signal indicates the PoE protocol type of the input voltage.

As to foregoing descriptions, the power converter of the PD in the PoE system and the control method thereof as described in embodiments of the invention can adjust a start-up portion of the primary-side control signal of the transformer according to a signal used for determining the type of power system, so that the detecting circuit located at the secondary side of the transformer can know whether or not the start-up portion of the primary-side control signal has been adjusted based on the mapping signal generated in the secondary side of the transformer corresponding to the primary-side control signal. By this manner, the detecting circuit located at the secondary side of the transformer of the PD can obtain what the PoE communication protocol is taken by the PSE without use of the optical coupler. As a result, the use of optical coupler can be avoided.

Several exemplary embodiments accompanied with figures are described in detail below to further describe the disclosure in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
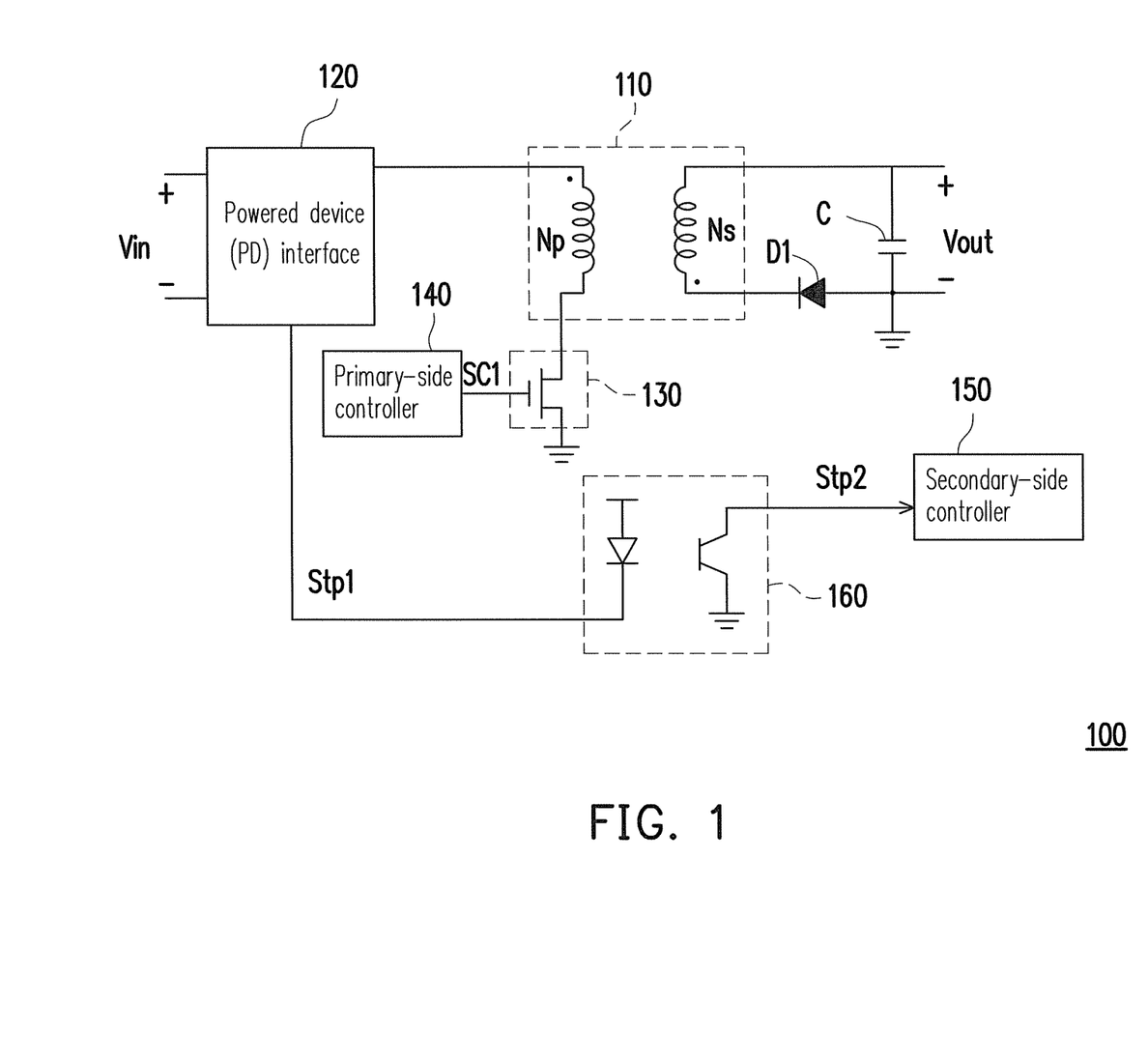
FIG. 1 is a circuit diagram illustrating a power converter 100 of a powered device in PoE system, according to an embodiment of the invention.

FIG. 1 is a circuit diagram illustrating a power converter 100 of a powered device in PoE system, according to an embodiment of the invention. The power converter 100 includes a transformer 110, a PD interface 120, a primary-side switch 130, a primary-side controller 140 and a secondary-side controller 150. The transformer 100 includes a primary-side winding Np and a secondary-side winding Ns. A terminal of the primary-side switch 130 is coupled to primary-side winding Np, and another terminal of the primary-side switch 130 is coupled to a ground terminal and a control terminal of the primary-side switch 130 receives a primary-side control signal SC1, generated by the primary-side controller 140. In other words, the primary-side control signal SC1 is used to control the primary-side switch 130, so as to transport the power from the primary-side winding Np to the secondary-side winding Ns. The primary-side switch 130 can be implemented by transistor. The secondary-side winding Ns is connected to a capacitor C and a diode D1, so as to generate an output voltage Vout between both terminals of the capacitor C.

The PD interface 120 can be implemented by hardware circuit, which is compatible with the related specification of the PoE system. The PD interface 120 obtains an input voltage Vin from a terminal of the network cable, such as twisted pair cable, and the PD interface 120 can determine that the PoE protocol type of the input voltage Vin is belonging to type-1 power system or type-2 power system, based on the input voltage Vin, and then a first power type signal Stp1 is generated according to the determined result.

In the embodiment, the PoE protocol can be divided into two kinds: type-1 power system using IEEE 802.3 AF and type-2 power system using IEEE 802.3 AT. Therefore, in a setting, it indicates that input voltage Vin meets type-1 power system when the logic level of the first power type signal Stp1 is "0", and it indicates that input voltage Vin meets type-1 power system when the logic level of the first power type signal Stp1 is "1". However, as known by the one using the embodiment, when PoE protocol type can be divided into three or more, the invention can still be applied and the first power type signal Stp1 may have multiple bits for the implementation, accordingly, to transmit the PoE protocol type from the primary side of the transformer to the secondary-side.

Figure 2:
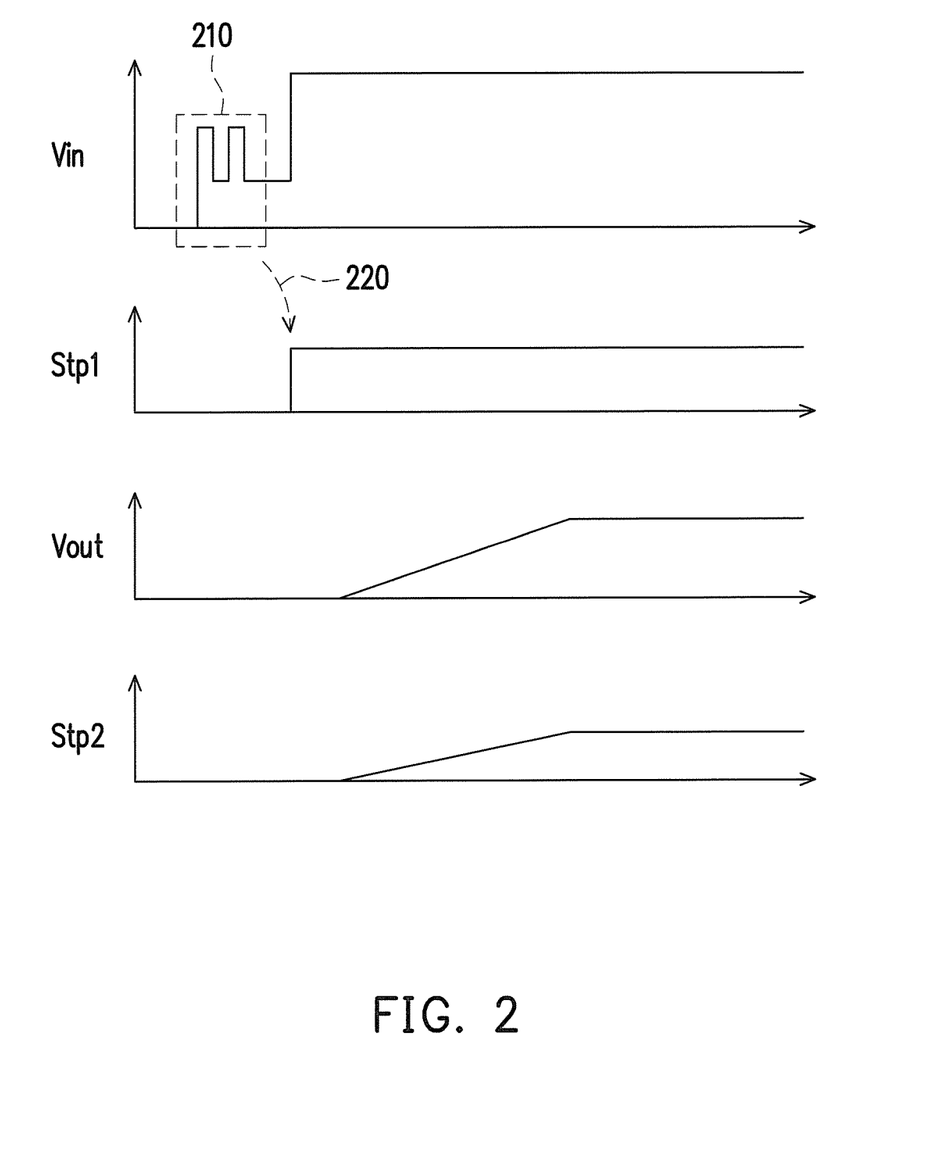
FIG. 2 is signal waveform chart illustrating the signal waveform of the input voltage Vin, the first power type signal Stp1, the output voltage Vout, and the second power type signal Stp2, according to an embodiment of the invention.

To transmit the first power type signal Stp1 from the primary side of the transformer to the secondary-side, the power converter 100 in FIG. 1 takes the optical coupler 160 to transmit the first power type signal Stp1 to the secondary-side controller 150 to become as a second power type signal Stp2. In detail, FIG. 2 is signal waveform chart illustrating the signal waveform of the input voltage Vin, the first power type signal Stp1, the output voltage Vout, and the second power type signal Stp2. Referring to FIG. 1 and FIG. 2, the PD interface 120 can recognize the power type of the input voltage Vin based on the initial signal 210 of the input voltage Vin. The input voltage Vin in FIG. 2 is belonging to type-2 power system, so the PD interface 120 sets the first power type signal Stp1 to the logic 1, as indicated by arrow 220. In addition, since the power source of the optical coupler 160 is from the output voltage Vout, the second power type signal Stp2 is gradually set to logic 1, in accordance with the rising of the output voltage Vout.

Because the LED light source in the optical coupler 160 is easily broken and the optical coupler 160 cannot be integrated into the circuit, it then occupies a larger circuit area. For this consideration, an embodiment of the invention would encode the power type information as carried by the first power type signal Stp1 into the primary-side control signal SC1 and recognize this power type information by detecting the mapping signal as induced and generated by the secondary-side winding Ns, so to avoid the use of optical coupler but still achieve the same effect.

Figure 3:
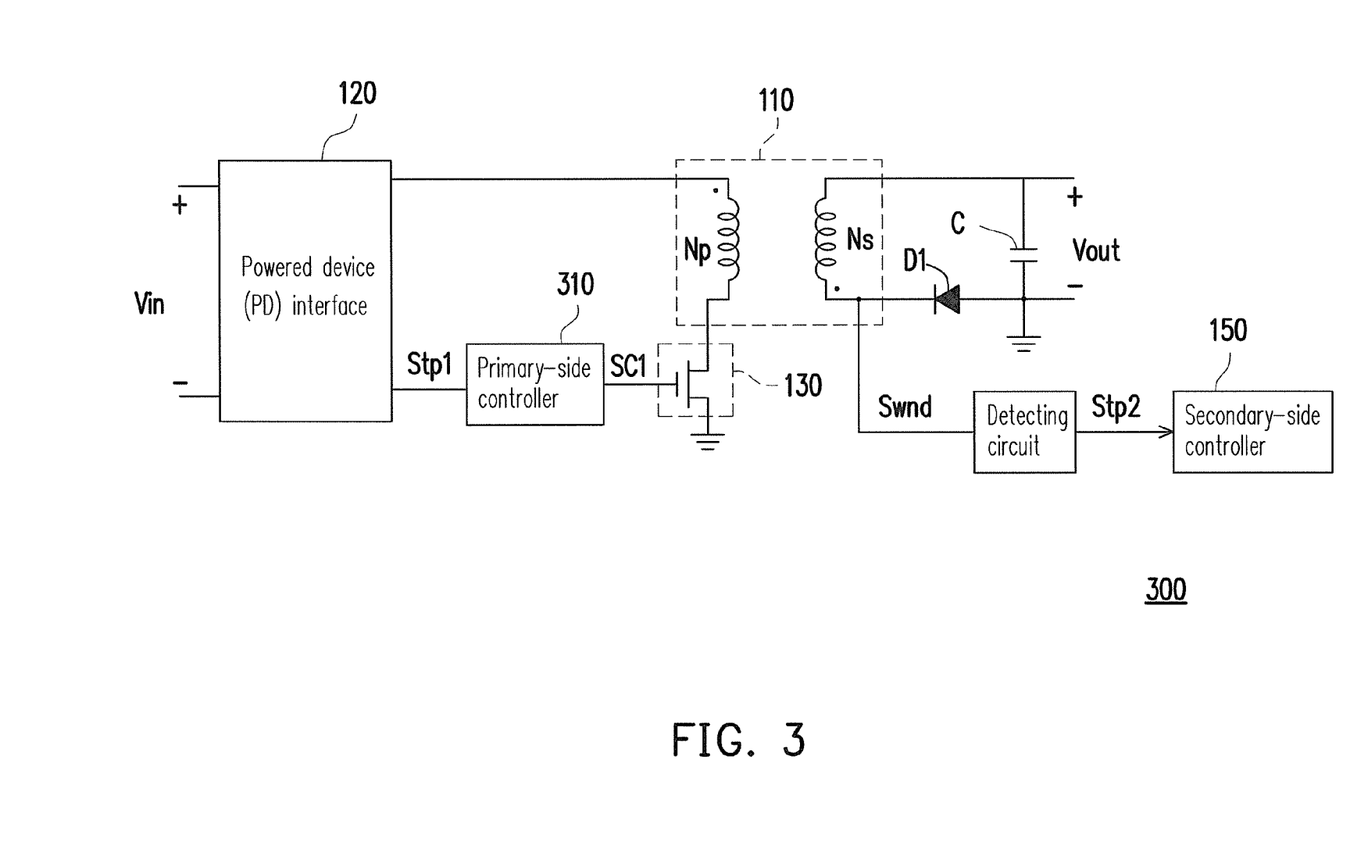
FIG. 3 is a circuit diagram illustrating the power converter 300, according to an embodiment of the invention.

FIG. 3 is a circuit diagram illustrating the power converter 300, according to an embodiment of the invention. The power converter 300 is located in the PD of the PoE system. The power converter 300 includes a transformer 110, a PD interface 120, a primary-side switch 130, and a capacitor C with a diode D1 at the secondary side of the transformer 110, but also includes a primary-side controller 310 and a detecting circuit 320 coupled to the secondary-side winding Ns. The primary-side controller 310 receives the first power type signal Stp1 to adjust the primary-side control signal SC1. The primary-side control signal SC1 is used to control the primary-side switch 130. The detecting circuit 320 detects the mapping signal Swnd generated in the secondary-side winding Ns according to the primary-side control signal SC1 to generate a second power type signal Stp2. Thereby, the secondary-side switch 150 can obtain the power type to which the input voltage Vin belongs, according to the second power type signal Stp2.

Since there are several ways to implement the adjustment on the primary-side control signal SC1 in the embodiments of the invention, a first embodiment in the embodiments of the invention would adjust the pulse width modulation (PWM) of the primary-side control signal SC1 as an example.

Figure 4:
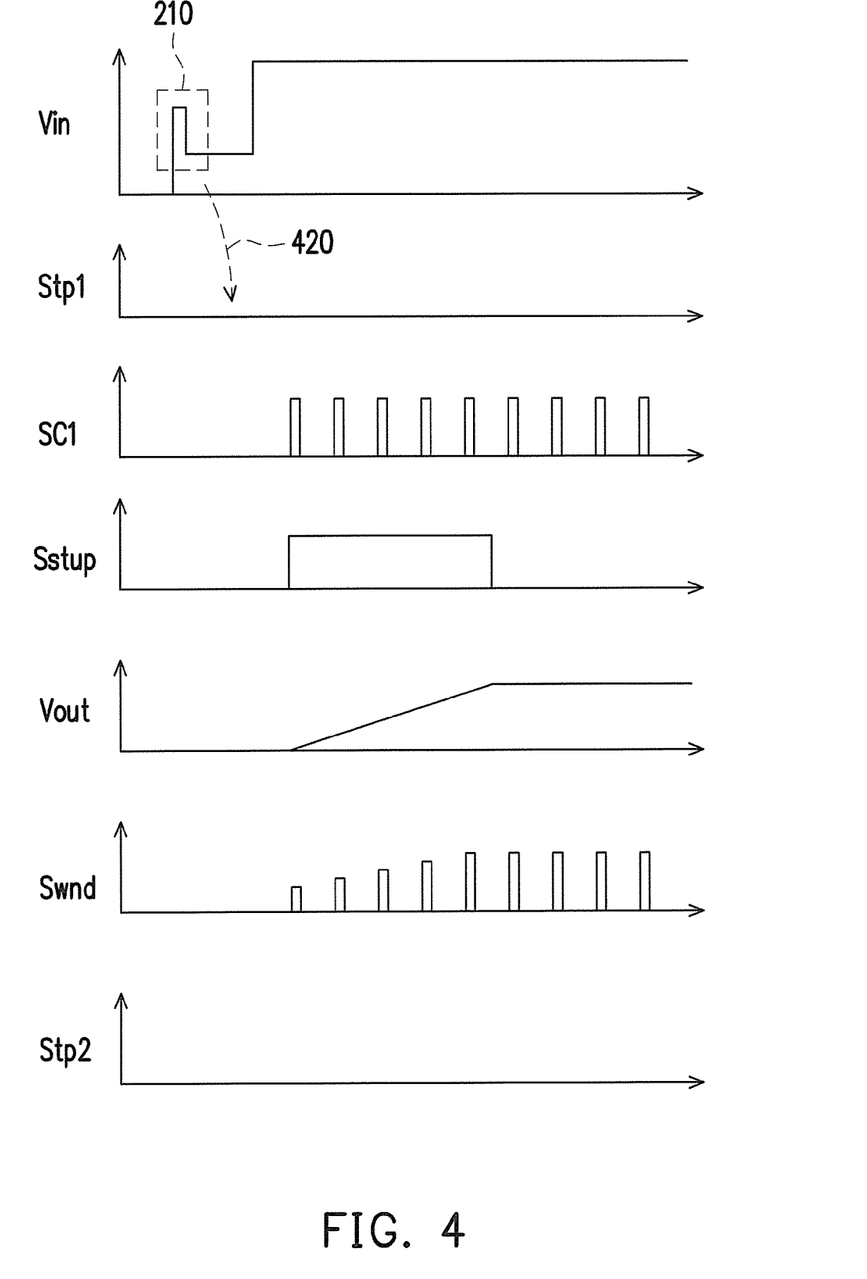
FIG. 4 and FIG. 5 are drawings illustrating waveforms for the signals in the power converter 300, according to a first embodiment of the invention.
Figure 5:
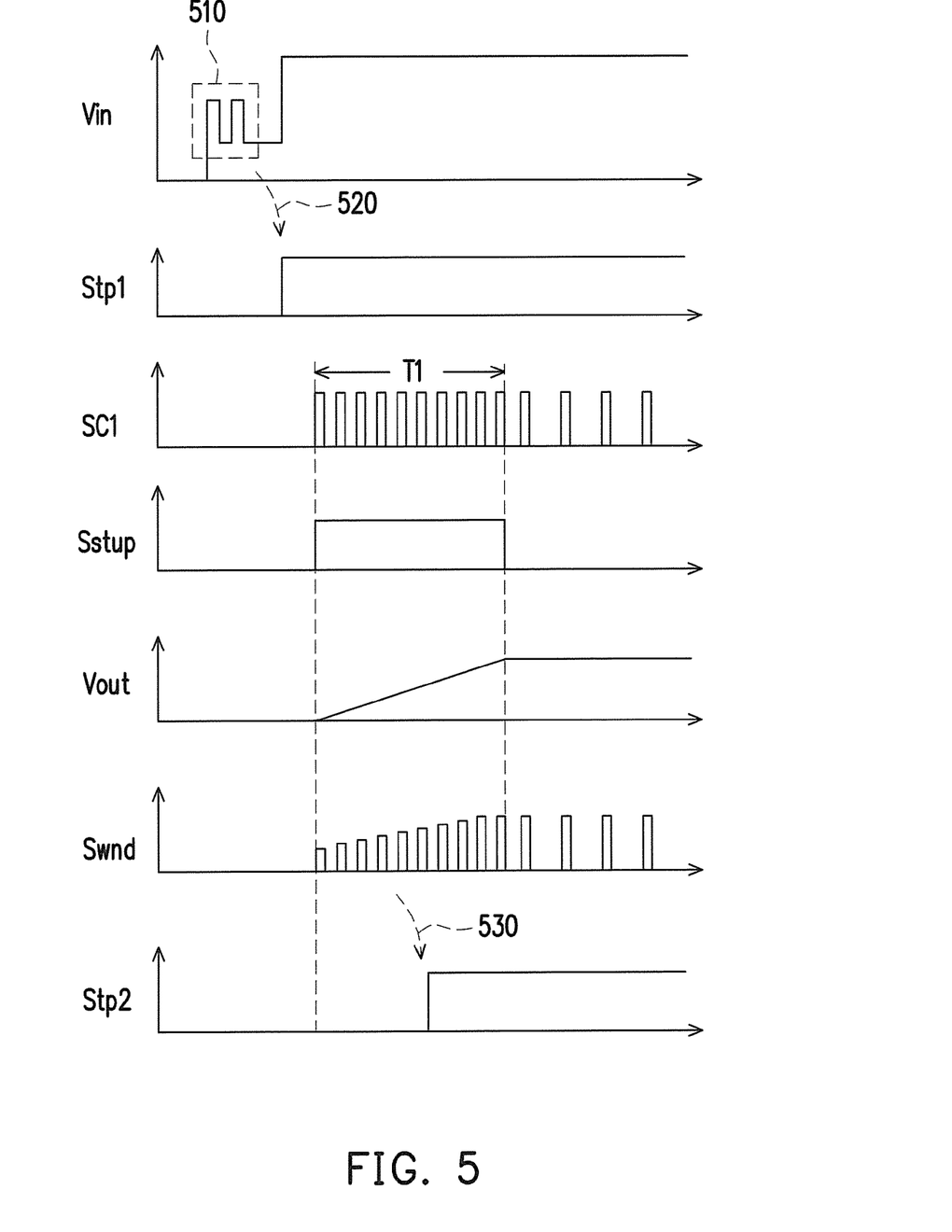

FIG. 4 and FIG. 5 are drawings illustrating waveforms for the signals in the power converter 300, according to a first embodiment of the invention. FIG. 4 illustrates the waveforms for various signals when the PoE protocol type of the input voltage Vin is a type-1 power system. FIG. 5 illustrates the waveforms for various signals when the PoE protocol type of the input voltage Vin is a type-2 power system. Referring to FIG. 3 and FIG. 4, when the initial signal 410 of the input voltage Vin is the way as shown in FIG. 4, the PD interface 120 can obtain the PoE protocol type of the input voltage Vin to be the type-1 power system based on the initial signal 410 of the input voltage Vin. Therefore, the PD interface 120 then sets the first power type signal Stp1 to logic 0, as indicated by the arrow 420. Since the first power type signal Stp1 is at logic 0, the primary-side controller 310 then does not adjust the PWM frequency, such as 100 KHz, of the primary-side control signal SC1. The mapping signal Swnd is gradually getting a waveform similar to the primary-side control signal SC1 in accordance with the rising of the output voltage Vout. The detecting circuit 320 determines whether or not the PWM frequency (e.g. such as 100 KHz) of the mapping signal Swnd at the start-up time period T1, that is the enabling period for the start-up time period signal Sstup, is the same as the preset PWM frequency. If the PWM frequency (e.g. 100 KHz) of the mapping signal Swnd is the same as the preset PWM frequency, the detecting circuit 320 then generates the second power type signal Stp2 at logic 0, so as to indicate that the PoE protocol type of the input voltage Vin is type-1 power system.

Referring to FIG. 3 and FIG. 5, when the initial signal 510 of the input voltage Vin is the way as shown in FIG. 5, the PD interface 120 can obtain the PoE protocol type of the input voltage Vin to be the type-2 power system based on the initial signal 510 of the input voltage Vin. Therefore, the PD interface 120 then sets the first power type signal Stp1 to logic 1, as indicated by the arrow 520. Since the first power type signal Stp1 is at logic 1, the primary-side controller 310 then raises the PWM frequency of the primary-side control signal SC1 in the start-up time period T1, for example, changing from 100 KHz to 200 KHz. The detecting circuit 320 then determines whether or not the PWM frequency of the mapping signal Swnd at the start-up time period T1 is the same as the preset PWM frequency. Since the PWM frequency (e.g. 200 KHz) of the mapping signal Swnd is higher than the preset PWM frequency (e.g. 100 KHz), the detecting circuit 320 the generates the second power type signal Stp2 at logic 1 as indicated by arrow 530, so as to indicate that the PoE protocol type of the input voltage Vin is type-2 power system.

Figure 6:
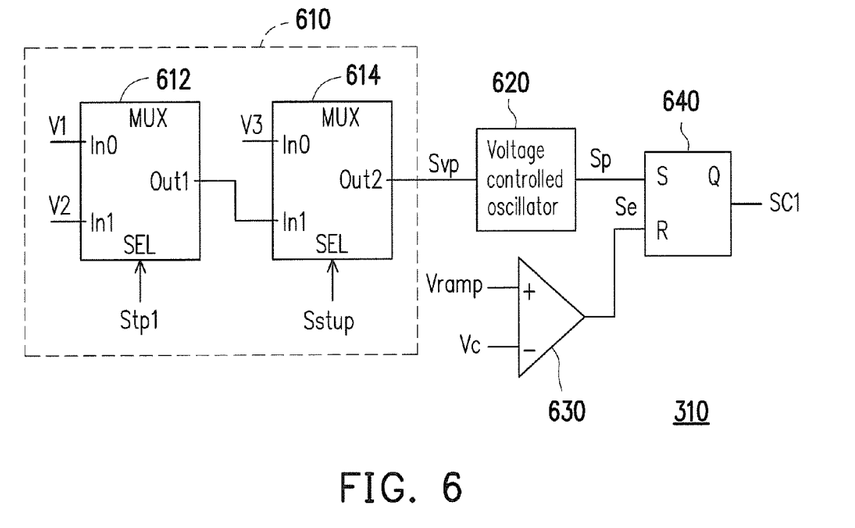
FIG. 6 is a block diagram illustrating the primary-side controller 310 in FIG. 3, according to a first embodiment of the invention.

FIG. 6 is a block diagram illustrating the primary-side controller 310 in FIG. 3. In FIG. 6, the primary-side controller 310 includes a multiplexer module 610, a voltage controlled oscillator 620, an error amplifier 630, and a first flip-flop 640. The multiplexer module 610 at the start-up time period selectively selects one of multiple voltages (e.g. first voltage V1 or second voltage V2) based on the first power type signal Stp1 to serve as the voltage control signal Svp. During the period other than the start-up time period, the preset voltage (e.g. third voltage V3) is used as the voltage control signal Svp. In detail, the multiplexer module 610 can be formed from a first multiplexer 612 and a second multiplexer 614. The first input terminal In0 of the first multiplexer 612 receives the first voltage V1, and the second input terminal In1 of the first multiplexer 612 receives the second voltage V2. The control terminal SEL of the first multiplexer 612 receives the first power type signal Stp1. The first input terminal In0 of the second multiplexer 614 receives the preset voltage V3, and the second input terminal In1 of the second multiplexer 614 is coupled to the output terminal Out1 of the first multiplexer 612. The control terminal SEL of the second multiplexer 614 receives the start-up time period signal Sstup. The output terminal Out2 of the second multiplexer 614 generates the voltage control signal Svp.

In an assumption, when the voltage controlled oscillator 620 receives the first voltage V1, it causes that the PWM frequency (e.g. 80 KHz) of the pulse signal Sp generated by the voltage controlled oscillator 620 is less than the normal value and the pulses of the pulse signal Sp gets slow. When the voltage controlled oscillator 620 receives the second voltage V2, it causes that the PWM frequency (e.g. 200 KHz) of the pulse signal Sp generated by the voltage controlled oscillator 620 is higher than the normal value and the pulses of the pulse signal Sp gets fast. When the voltage controlled oscillator 620 receives the preset voltage V3, it causes that the PWM frequency (e.g. 100 KHz) of the pulse signal Sp generated by the voltage controlled oscillator 620 is kept at the preset value under normal operation. In this manner, when the first power type signal Stp1 is at logic 0 and located within the enabling period of the signal Sstup, the output terminal Out2 of the second multiplexer 614 would output the first voltage V1 to serve as the voltage control signal Svp, so that the PWM frequency (80 KHz) of the pulse signal Sp generated by the voltage controlled oscillator 620 is equal to or less than the preset PWM value (100 KHz). When the first power type signal Stp1 is at logic 0 and located within the enabling period of the signal Sstup, the output terminal Out2 of the second multiplexer 614 would output the second voltage V2 to serve as the voltage control signal Svp, so that the PWM frequency (200 KHz) of the pulse signal Sp generated by the voltage controlled oscillator 620 is higher than the preset PWM value (100 KHz). During the disabling period of the signal Sstup, the output terminal Out2 of the second multiplexer 614 would output the preset voltage V3 to serve as the voltage control signal Svp, so that the PWM frequency of the pulse signal Sp generated by the voltage controlled oscillator 620 is equal to the preset PWM value (100 KHz).

The invert terminal of the error amplifier 630 is coupled to the control signal Vc of the power converter. The control signal Vc is a signal used by the usual power converter for controlling the output voltage Vout. The non-invert terminal of the error amplifier 630 is coupled to the ramp signal Vramp. The ramp signal Vramp can be the ramp signal synchronising with the pulse signal Sp under voltage-mode control, or the ramp signal synchronising with the primary-side control signal SC1 under current-mode control. The output terminal of the error amplifier 630 generates the error signal Se when the voltage value of the ramp signal Vramp is greater than the voltage value of the control signal Vc. The first terminal (setting terminal) of the first flip-flop 640 receives the pulse signal Sp, the second terminal (reset terminal) of the first flip-flop 640 receives the error signal Se, and the output terminal Q of the first flip-flop 640 generates the primary-side control signal SC1.

Figure 7:
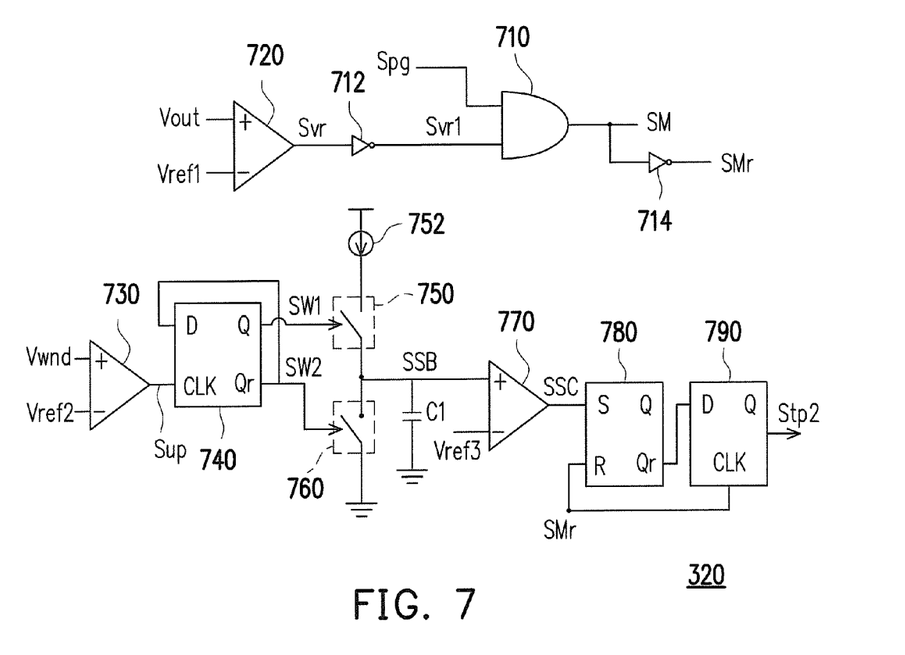
FIG. 7 is a drawing illustrating a circuit diagram of the detecting circuit 320 in FIG. 3.
Figure 8:
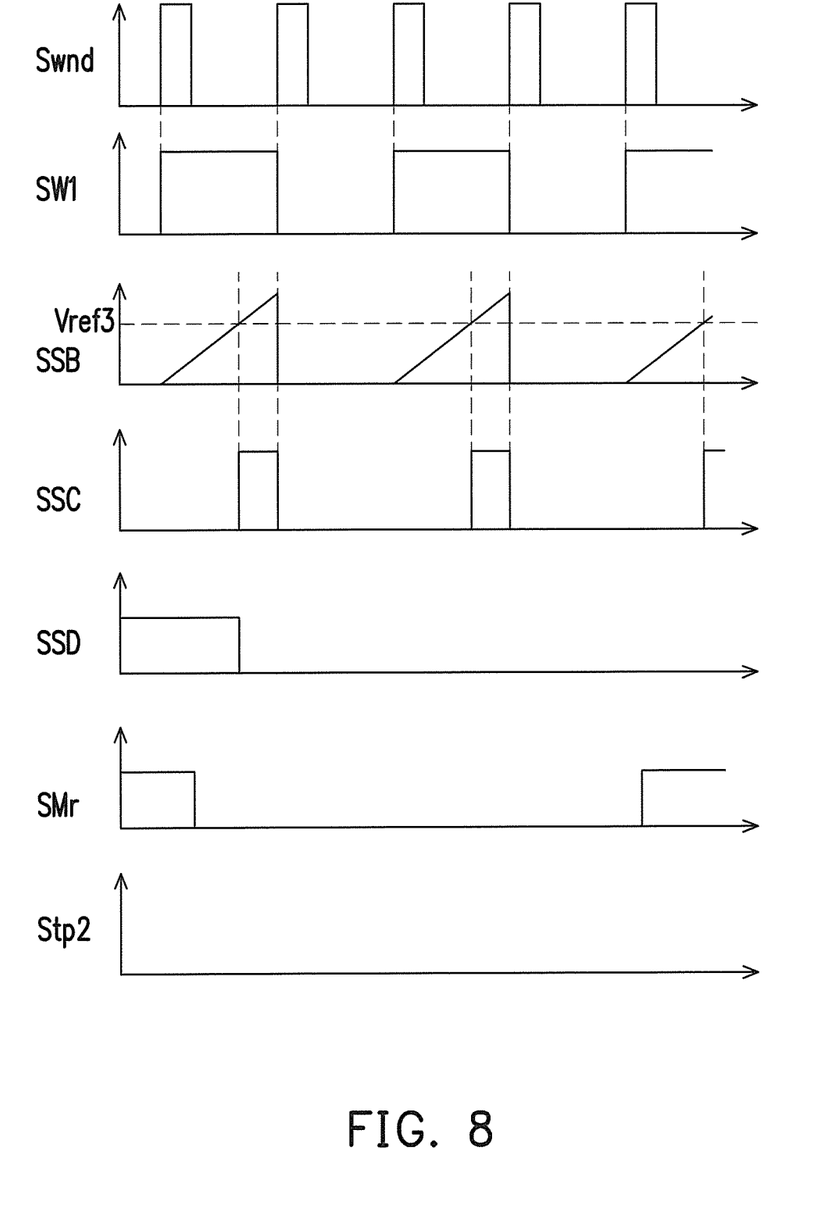
FIG. 8 and FIG. 9 are drawings illustrating the waveforms of various signals in the detecting circuit 320.
Figure 9:
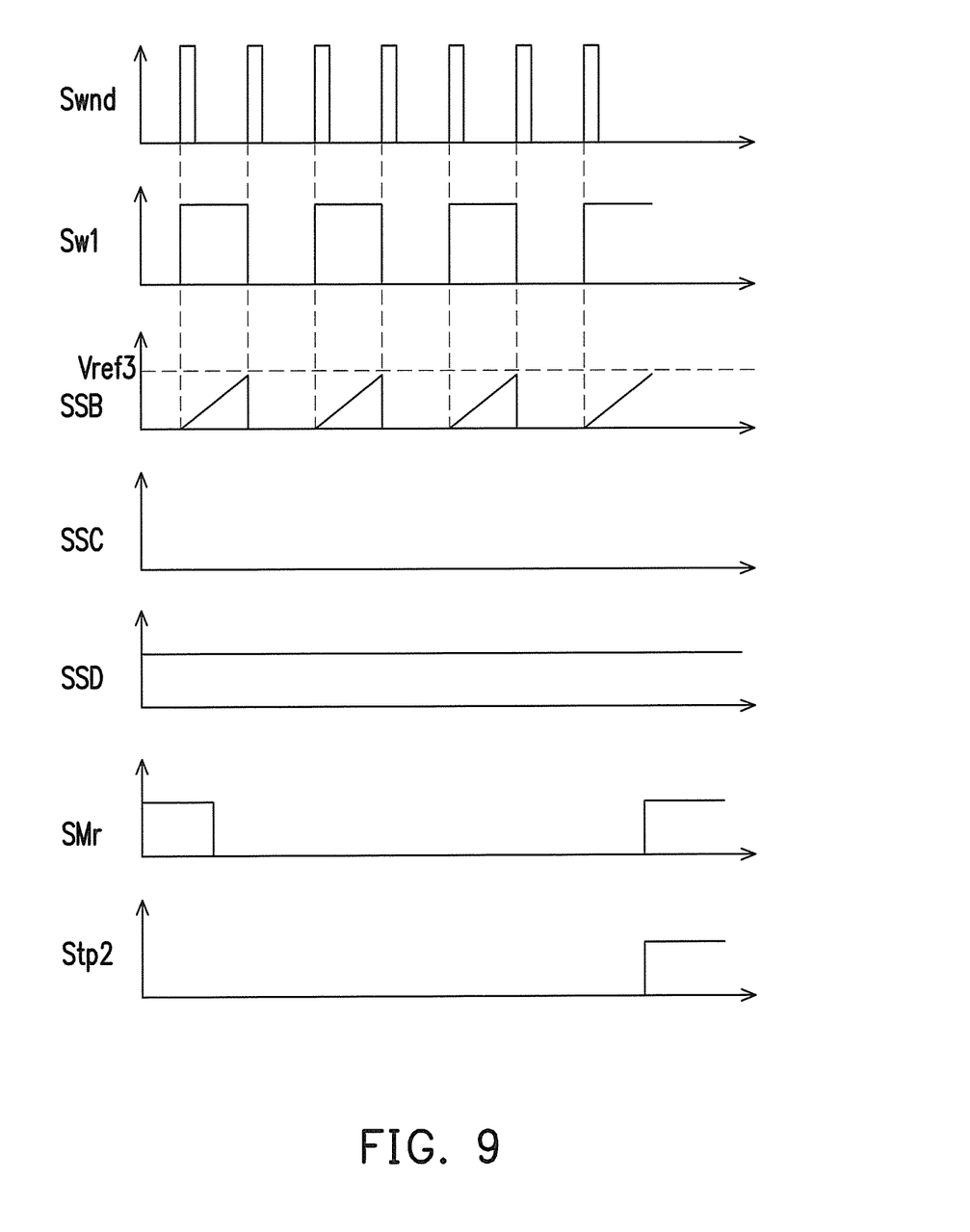

FIG. 7 is a drawing illustrating a circuit diagram of the detecting circuit 320 in FIG. 3. FIG. 8 and FIG. 9 are drawings illustrating the waveforms of various signals in the detecting circuit 320. Referring to FIG. 7, the detecting circuit 320 mainly includes a first comparator 710, inverters 712 and 714, an AND gate 720, a second comparator 730, a first data flip-flop 740, a first switch 750, a second switch 760, a first capacitor C1, a thirst comparator 770, a second flip-flop 780 and a second data flip-flop 790. The invert terminal of the first comparator 710 receives a first reference voltage Vref1. The non-invert terminal of the first comparator 710 receives the output voltage Vout of the transformer 110 in FIG. 3. When the output voltage Vout is greater than the first reference voltage Vref1, the output terminal of the first comparator 710 generates an output-terminal verification signal Svr. The first input terminal of the AND gate 720 receives a normal-voltage signal Spg, the second input terminal of the AND gate 720 receives an invert output-terminal verification signal Svr1 via the inverter 712. The normal-voltage signal Spg is a judging signal used by the power converter itself to judge whether or not the power as received is in normal operation, so to verify that the power converter itself is under normal operation. The AND gate 720 generates a measuring signal SM at the output terminal based on the normal-voltage signal Spg and the invert output-terminal verification signal Svr1, and an invert measuring signal SMr (shown by waveform in FIG. 8 and FIG. 9) can be generated via the inverter 714.

In FIG. 7, the invert terminal of the second comparator 730 receives a second reference voltage Vref2. The non-invert terminal of the second comparator 730 receives the mapping signal Swnd. The second comparator 730 at the output terminal generates a rising-edge trigger signal Sup when the voltage value of the mapping signal Swnd is greater than the voltage value of the second reference voltage Vref2. The clock input terminal CLK of the first data flip-flop 740 receives the rising-edge trigger signal Sup, the invert data terminal Qr of the first data flip-flop 740 is coupled to the data input terminal D of the first data flip-flop 740. The data terminal D and the invert data terminal Qr of the first data flip-flop 740 respectively generate a first switch signal SW1 and a second switch signal SW2. A first terminal of the first switch 750 is connected to a current source 752, and a control terminal of the first switch 750 receives the first switch signal SW1. A first terminal of the second switch 760 is connected to a second terminal of the first switch 750, a second terminal of the second switch 760 is coupled to the ground terminal, and a control terminal of the second switch 760 receives the second switch signal SW2. A first terminal of the first capacitor C1 is coupled to the second terminal of the first switch 750 and the first terminal of the second switch 760, and a second terminal of the first capacitor C1 is coupled to the ground terminal. Thereby, a charging ramp signal SSB is generated at the first terminal of the first capacitor C1 depending on whether or not the first switch 750 is conducted under control by the first switch signal SW1. The invert terminal of the third comparator 770 receives the third reference voltage Vref3, the non-invert terminal of the third comparator 770 receives the charging ramp signal SSB, and the output terminal of the third comparator 770 generates a charging enabling signal SSC when the voltage value of the charging ramp signal SSB is greater than the voltage value of the third reference voltage Vref3.

The first terminal (setting terminal) S of the second flip-flop 780 receives the charging enabling signal SSC, the second terminal (reset terminal) R of the second flip-flop 780 receives the invert measuring signal SMr. The invert data output terminal Qr of the second flip-flop 780 generates a signal SDD. The data input terminal D of the second data flip-flop 790 is coupled to the invert data output terminal Qr of the second flip-flop 780 to receives the signal SDD, the clock input terminal CLK of the second data flip-flop 790 receives the invert measuring signal SMr, and the output terminal Q of the second data flip-flop 790 generates the second power type signal Stp2.

Referring to FIG. 7, FIG. 8 and FIG. 9, if the conducting duration of the first switch signal SW1 not long, then the maximum voltage value of the charging ramp signal SSB would be not over the third reference voltage Vref3 as shown in FIG. 9, whereby it can be obtained whether or not the PWM frequency of the mapping signal Swnd is faster than the preset PWM frequency value, and further the second power type signal Stp2 can be generated through the second flip-flop 780 and the second data flip-flop 790.

The embodiments of the invention can let the detecting circuit located at the secondary side of the transformer know the PoE protocol type of the input voltage Vin through the adjustment on the PWM frequency of the primary-side control signal. In addition, the foregoing objectives can also be implemented by adjusting the signal pulse width, the signal waveform, or the pulse density of the primary-side control signal. The relating circuit satisfying the second embodiment of the invention is also provided here. The difference between the second embodiment and the first embodiment is the difference of the primary-side controller 310 and the detecting circuit 320 located at the secondary side of the transformer 110 in FIG. 3. Therefore, the primary-side controller 1000 in FIG. 10 of the second embodiment is taken to replace the primary-side controller 310 in FIG. 3, and the detecting circuit 1200 in FIG. 12 is taken to replace the detecting circuit 320 in FIG. 3.

Figure 10:
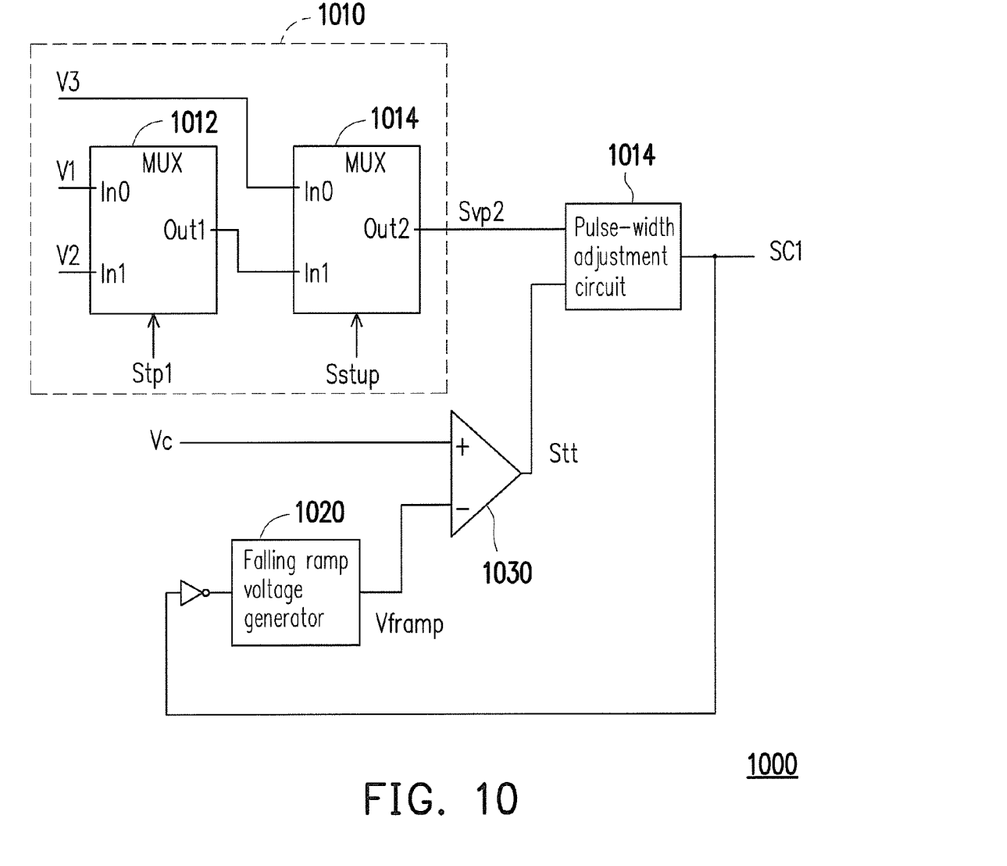
FIG. 10 is a drawing illustrating a circuit diagram of the primary-side controller 1000 of the power converter, according to a second embodiment of the invention.
Figure 11:
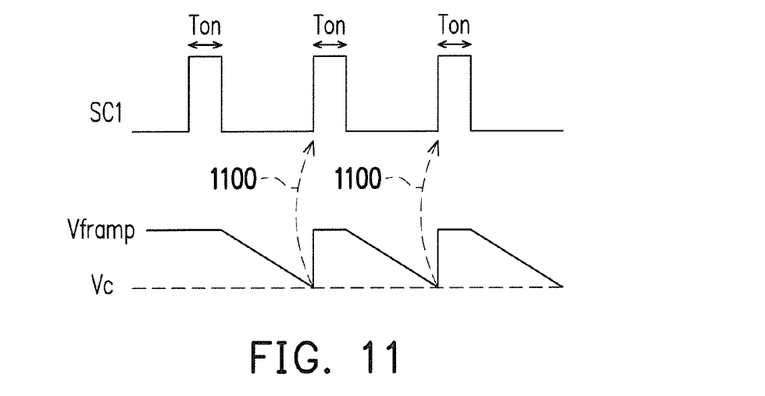
FIG. 11 is a drawing illustrating the waveforms of the first power type signal Stp1, the falling ramp signal Vframp and the control signal Vc in FIG. 10.

FIG. 10 is a drawing illustrating a circuit diagram of the primary-side controller 1000 of the power converter, according to a second embodiment of the invention. FIG. 11 is a drawing illustrating the waveforms of the first power type signal Stp1, the falling ramp signal Vframp and the control signal Vc in FIG. 10. The primary-side controller 1000 in FIG. 10 includes a multiplexer module 1010, a falling ramp voltage generator 1020, a first comparator 1030 and a pulse-width adjustment circuit 1014. The multiplexer module 1010 of second embodiment can be implemented from a first multiplexer 1012 and a second multiplexer 1014. The multiplexer module 1010 at the start-up time period selectively selects one of multiple voltages (e. g. first voltage V1 or second voltage V2) based on the first power type signal Stp1 to serve as the voltage control signal. During the period other than the start-up time period, the preset voltage (e.g. third voltage V3) is used as the voltage control signal Svp2. In detail, the first input terminal In0 of the first multiplexer 1012 receives the first voltage V1, and the second input terminal In1 of the first multiplexer 1012 receives the second voltage V2. The control terminal SEL of the first multiplexer 1012 receives the first power type signal Stp1. The first input terminal In0 of the second multiplexer 1014 receives the preset voltage V3, and the second input terminal In1 of the second multiplexer 1014 receives the output terminal Out1 of the first multiplexer 1012. The control terminal SEL of the second multiplexer 1014 receives the start-up time period signal Sstup. The output terminal Out2 of the second multiplexer 1014 generates the voltage control signal Svp2.

Referring to FIG. 10 and FIG. 11, the falling ramp voltage generator 1020 can generate the falling ramp voltage Vframp, according to an invert of the primary-side control signal SC1. The non-invert terminal of the first comparator 1030 receives the control signal Vc, the invert terminal of the first comparator 1030 receives the falling ramp voltage Vframp. The output terminal of the first comparator 1030 generates a pulse-width adjustment trigger signal Stt when the voltage value of the falling ramp voltage Vframp is less than the voltage value of the control signal Vc. The pulse-width adjustment circuit 1040 receives the voltage control signal Svp2 and the pulse-width adjustment trigger signal Stt, to generate the primary-side control signal SC1 at enabling state as indicated by arrow 1110 when the pulse-width adjustment trigger signal Stt is enabling, and to adjust the signal pulse width Ton of the primary-side control signal SC1, based on the voltage control signal Svp2. In the embodiment, the signal pulse width Ton corresponding to the first voltage V1 is the longest, the signal pulse width Ton corresponding to the preset voltage V3 is normal length, and the signal pulse width Ton corresponding to the second voltage V2 is the shortest.

Figure 12:
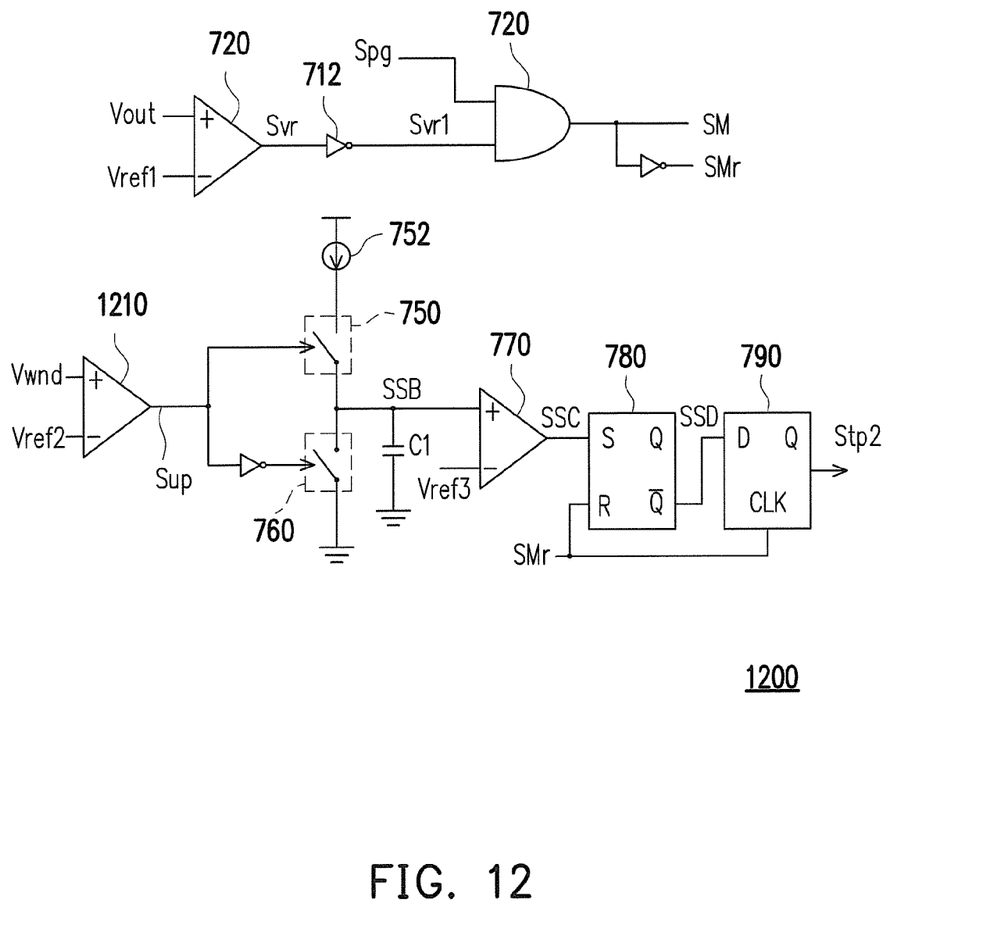
FIG. 12 is a drawing illustrating a circuit diagram of the detecting circuit 1200 of the power converter, according to the second embodiment of the invention.

FIG. 12 is a drawing illustrating a circuit diagram of the detecting circuit 1200 of the power converter, according to the second embodiment of the invention. The different between the detecting circuit 1200 in FIG. 12 and the detecting circuit 320 in FIG. 7 is that the detecting circuit 1200 uses the second comparator 1210, the inverter 1220, the first switch 750, the second switch 760, the first capacitor C1 and the third comparator 770 to measure the signal pulse width of the mapping signal Swnd. However, the detecting circuit 320 uses the second comparator 730, the first data flip-flop 740, the first switch 750, the second switch 760, the first capacitor C1 and the third comparator 770 to measure the PWM frequency of the mapping signal Swnd. In detail, the invert terminal of the second comparator 1210 in FIG. 12 receives the second reference voltage Vref2, the non-invert terminal of the second comparator 1210 in FIG. 12 receives the mapping signal Swnd. When the voltage value of the mapping signal Swnd is greater than the second reference voltage Vref2, the first switch 750 is then conducted and the first capacitor C1 is charged, so to generate the charging ramp signal SSB. If the voltage value of the charging ramp signal SSB is greater than the third reference voltage Vref3, then it indicates that the signal pulse width of the mapping signal Swnd is greater than the preset value, and then indicates that the PoE protocol type of the input voltage Vin should be the type-2 power system. The flip-flop 780 and the data flip-flop 790 then set the logic state of the second power type signal Stp2 to logic 1. Relatively, if the voltage value of the charging ramp signal SSB is not greater than the third reference voltage Vref3, then it indicates that the signal pulse width of the mapping signal Swnd is less than or equal to the preset value, and then indicates that the PoE protocol type of the input voltage Vin should be the type-1 power system. The flip-flop 780 and the data flip-flop 790 then set the logic state of the second power type signal Stp2 to logic 0.

Figure 13:
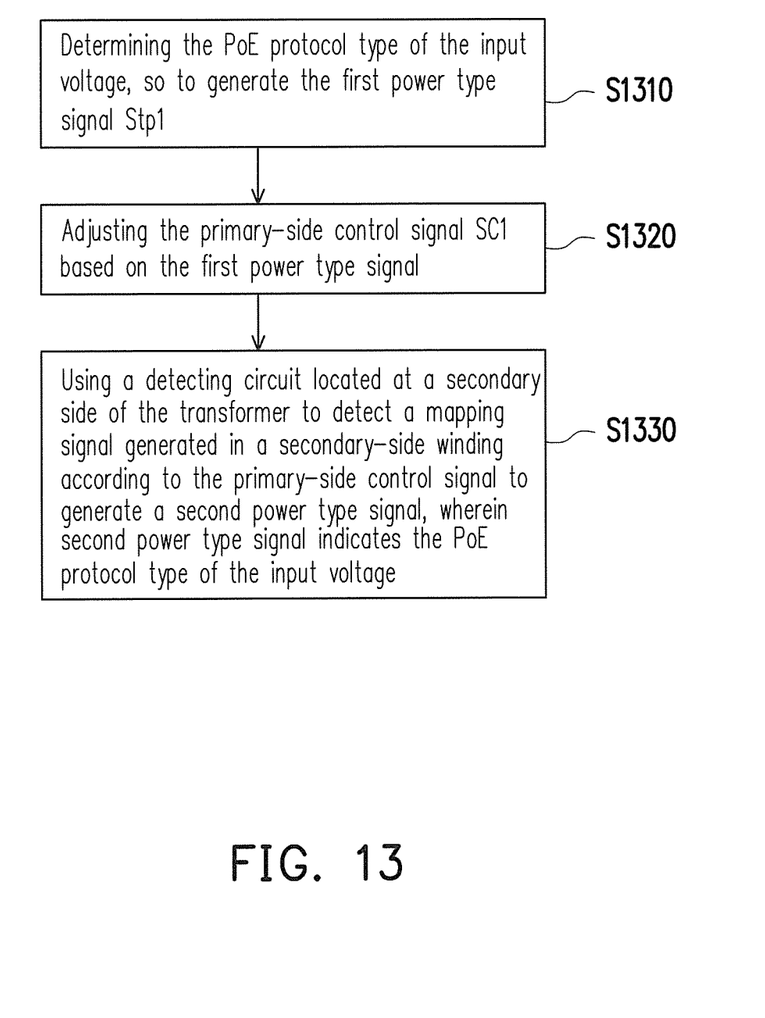
FIG. 13 is a drawing illustrating a flow diagram of the control method for the power converter, according to an embodiment of the invention.

An embodiment of the invention also provides a control method for power converter, the power converter is located in the PD of PoE system. FIG. 13 is a drawing illustrating a flow diagram of the control method for the power converter, according to an embodiment of the invention. Referring to FIG. 3 and FIG. 13, in step S1310, the PD interface 120 determines the PoE protocol type of the input voltage Vin, so to generate the first power type signal Stp1. In step S1320, the primary-side controller 130 adjusts the primary-side control signal SC1 based on the first power type signal Stp1, wherein the primary-side control signal SC1 is used to control the primary-side switch 130 of the transformer 110 in the power converter 300. In step S1330, the detecting circuit 320 located at the secondary side of the transformer 110 is used to detect a mapping signal Swnd generated in the secondary-side winding Ns according to the primary-side control signal SC1 to generate a second power type signal Stp2. The second power type signal Stp2 indicates the PoE protocol type of the input voltage. The implementation of FIG. 13 in detail can refer to each device with relative descriptions in FIG. 1 to FIG. 12.

As to the foregoing descriptions, the power converter of the PD in PoE system and the control method thereof as described in embodiments of the invention can adjust the start-up portion of the primary-side control signal of the transformer based on the signal used for determining type of power system, so that the detecting circuit located at the secondary side of the transformer can know whether or not the start-up portion of the primary-side control signal has been adjusted based on the mapping signal generated in the secondary side of the transformer corresponding to the primary-side control signal. By this manner, the detecting circuit located at the secondary side of the transformer in the PD can obtain what the PoE communication protocol is taken by the PSE without use of the optical coupler. As a result, the use of optical coupler can be avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A primary side controller for a power converter of a powered device (PD) in a Power-over-Ethernet (PoE) system, comprising:
the primary side controller configured to form a switching signal to control a primary side switch that is configured to be coupled to control a primary side winding of a transformer, the transformer having the primary-side winding and a secondary-side winding and having a PD interface located on the primary side and configured to receive an input voltage from an Ethernet connection having an initial signal portion that indicates a PoE protocol type of the input voltage wherein the PD interface forms a power type signal from the initial signal portion of the input voltage, the power type signal indicating the PoE protocol type of the input voltage;
the primary side controller configured to receive the power type signal and control the switching signal responsively to the power type signal for a first time period and to subsequently control the switching signal independently of the power type signal; and
a detecting circuit configured to be coupled to the secondary-side winding, the detecting circuit configured to detect a mapping signal generated in the secondary-side winding in response to the switching signal, the detecting circuit configured to generate a secondary power type signal from the mapping signal wherein the secondary power type signal indicates the PoE protocol type of the input voltage.

2. The primary side controller as recited in claim 1, wherein
the primary side controller adjusts a start-up portion of the switching signal according to the power type signal.

3. The primary side controller as recited in claim 2, wherein in response to the PoE protocol type of a first type, the primary-side controller sets a pulse width modulation (PWM) frequency of the switching signal for at least a portion of the first time period to be equal to or less than a PWM frequency after the first time period, and
in response to the PoE protocol type of a second type, the primary side controller sets the PWM frequency of the switching signal for at least the portion of the first time period to be greater than the PWM frequency after the first time period.

4. The primary side controller as recited in claim 1, wherein in response to the PoE protocol type of a first type, the primary side controller sets a signal pulse width of the switching signal to a first pulse width for at least the portion of the first time period, and
in response to the PoE protocol type of a second type, the primary side controller sets the signal pulse width of the switching signal to a second pulse width for at least the portion of the first time period, wherein the first pulse width is greater than the second pulse width.

5. The primary side controller as recited in claim 1, wherein in response to the PoE protocol type of a first type, the primary side controller sets a pulse width density of the switching signal to a first density for at least the portion of the first time period, and in response to the PoE protocol type of a second type, the primary side controller sets the pulse width density of the switching signal to a second density, wherein the first density is different from the second density.

6. A method of forming a control circuit for a power converter for a Power-over-Ethernet (PoE) system comprising:

configuring a primary side control circuit to form a switching signal to control a primary side switch for controlling a primary winding of a transformer wherein the primary winding is configured to receive an input voltage;

configuring the primary side control circuit to receive a first power type signal indicating a PoE protocol type of the input voltage, the first power type signal formed in response to an initial signal portion of the input voltage wherein the initial signal portion contains information indicating the PoE protocol type; and configuring the primary side control circuit to form the switching signal in response to the first power type signal for a first time period after the initial signal portion of the input voltage.

7. The method as recited in claim 6, further including determining the PoE protocol type of the input voltage according to a start-up signal of the input voltage.

8. The method as recited in claim 6, wherein the step of configuring the primary side control circuit to form the switching signal includes configuring the primary side control circuit to adjust a start-up portion of the primary-side switching signal according to the power type signal.

9. The method as recited in claim 8, wherein the step of configuring the primary side control circuit to adjust the switching signal includes configuring the primary side control circuit to, in response to the PoE protocol type of a first type, set a pulse width modulation (PWM) frequency of the start-up portion of the switching signal to be substantially equal to a PWM frequency after the start-up portion of the primary-side control signal, and configuring the primary side control circuit to, in response to the PoE protocol type of a second type, set the PWM frequency of the start-up portion of the switching signal to be greater than a PWM frequency after the start-up portion of the primary-side control signal.

10. The method as recited in claim 6, wherein the step of configuring the primary side control circuit to form the switching signal includes configuring the primary side control circuit to, in response to the PoE protocol type of a first type, setting a signal pulse width of the switching signal to a first pulse width, and in response to the PoE protocol type of a second type, set the signal pulse width of the switching signal to a second pulse width, wherein the first pulse width is greater than the second pulse width.

11. The method as recited in claim 6, wherein the step of configuring the primary side control circuit to form the switching signal includes configuring the primary side control circuit to, in response to the PoE protocol type of a first type, set a pulse width density of the switching signal to a first density, and in response to the PoE protocol type of a second type, set the pulse width density of the switching signal to a second density, wherein the first density is different from the second density.

12. The method of claim 8 further including forming a detecting circuit to be coupled on a secondary side of the transformer and receive a mapping signal formed by a secondary-side winding of the transformer;

configuring the detecting circuit to, according to the primary-side control signal, generate a second power type signal wherein the second power type signal indicates the PoE protocol type of the input voltage.

13. The method of claim 6 wherein configuring the primary side control circuit to form the switching signal according to the first power type signal for the first time period includes configuring the primary side control circuit to form the switching signal independently of the first power type after the first time period.

14. The method of claim 6 wherein configuring the primary side control circuit to form the switching signal includes configuring the primary side control circuit to set one of a frequency of the switching signal, a pulse width of the switching signal, or a pulse density of the switching signal in response to the first power type signal for the first time period but not subsequently to the first time period.

15. The method of claim 6 wherein configuring the primary side control circuit to form the switching signal includes configuring the primary side control circuit to, for the first time period, to encode the power type information indicating the PoE protocol type into the switching signal.

16. The method of claim 15 wherein configuring the primary side control circuit to form the switching signal, for the first time period, to include information indicating the PoE protocol type includes configuring the primary side control circuit to form the switching signal, subsequently to the first time period, to not include information indicating the PoE protocol type.

17. The primary side controller of claim 1 wherein the primary side controller is configured to form the switching signal to, for the first time period, encode the power type information indicating the PoE protocol type indicated by the initial signal of the input voltage.

18. The primary side controller of claim 3 wherein the primary side controller is configured to set the pulse width modulation frequency substantially independent of the output voltage for the portion of the first time period.

19. The primary side controller of claim 4 wherein the primary side controller is configured to set the first pulse width substantially independent of the output voltage.

20. The primary side controller of claim 5 wherein the primary side controller is configured to set the first density substantially independent of the output voltage.

* * * * *

UNITED STATES PATENT AND TRADEMARK OFFICE
CERTIFICATE OF CORRECTION

PATENT NO. : 9,929,671 B2
APPLICATION NO. : 15/286590
DATED : March 27, 2018
INVENTOR(S) : Chen-Hua Chiu It is certified that error appears in the above-identified patent and that said Letters Patent is hereby corrected as shown below:

In the Claims

Column 11, Line 33, Claim 8 before the phrase "power type signal," insert the text --first--

Signed and Sealed this
Eighth Day of May, 2018

Andrei Iancu
*Director of the United States Patent and Trademark Office*